United States Patent [19]
Masuda

[11] Patent Number: 4,497,335
[45] Date of Patent: Feb. 5, 1985

[54] CONTROL VALVE OF EXHAUST GAS RECIRCULATION APPARATUS

[75] Inventor: Yoshihiko Masuda, Toyota, Japan

[73] Assignee: Toyota Jidosha Kogyo Kabushiki Kaisha, Aichi, Japan

[21] Appl. No.: 343,477

[22] Filed: Jan. 28, 1982

Related U.S. Application Data

[63] Continuation-in-part of Ser. No. 106,050, Dec. 21, 1979, abandoned.

[51] Int. Cl.[3] .......... B08B 9/04; F16K 51/00

[52] U.S. Cl. .......... 137/244; 123/568; 137/375; 251/61.5

[58] Field of Search .......... 137/244, 375; 123/568; 251/61.2, 61.3, 61.4, 61.5, 118, 121, 122

[56] References Cited

U.S. PATENT DOCUMENTS

| | | | |
|---|---|---|---|
| 1,001,111 | 8/1911 | Wood | 137/244 |
| 1,838,706 | 12/1931 | Rogers | 137/244 |
| 2,881,783 | 4/1959 | Andrews | 137/244 |
| 3,552,426 | 1/1971 | Hester | 137/375 |
| 3,888,222 | 6/1975 | Tomita | 123/568 |
| 4,044,737 | 8/1977 | Nishimura | 123/568 |
| 4,052,969 | 10/1977 | Ando et al. | 123/568 |
| 4,120,480 | 10/1978 | Ando et al. | 251/61.5 |
| 4,128,109 | 12/1978 | Chervenak et al. | 251/118 |
| 4,349,003 | 9/1982 | Masuda | 123/568 |

FOREIGN PATENT DOCUMENTS

| | | | |
|---|---|---|---|
| 2549959 | 1/1977 | Fed. Rep. of Germany | 123/568 |

*Primary Examiner*—George L. Walton
*Attorney, Agent, or Firm*—Parkhurst & Oliff

[57] ABSTRACT

A control valve for an exhaust gas recirculation apparatus for leading part of the exhaust gas from an exhaust line to a suction line. This control valve comprises a throttling member provided in the passage for recirculating exhaust gas, and a valve body the opens and closes the passage of the throttling member. The hole provided in the base of the throttling member has an inside diameter smaller than the hole of the throttling portion. The end portion of the valve body has an outside diameter a little smaller than the inside diameter of the hole of the throttling member, and the length of this end portion in the axial direction is selected so as to allow at least its end to pass the base of the throttling member when the large diameter portion of the valve body is in contact with the base. The thickness of the base of the throttling member in the axial direction is sufficiently smaller than the inside diameter of the hole of the base.

7 Claims, 8 Drawing Figures

CONTROL VALVE OF EXHAUST GAS RECIRCULATION APPARATUS

CROSS-REFERENCE TO RELATED APPLICATIONS

This application is a CIP application of the parent application, Ser. No. 106,050 filed on Dec. 21, 1979, ABN.

BACKGROUND OF THE INVENTION

1. Field of the Invention

This invention relates to a control valve of an exhaust gas recirculation (EGR) apparatus.

2. Prior Art

It is well known that the EGR apparatus controls formation of nitrogen oxides in the combustion chamber by leading part of the exhaust gas from the exhaust line to the suction line through an EGR passage. EGR largely affects the operating characteristics of an engine, and so it becomes necessary to stop EGR in a certain engine condition. Therefore, an EGR valve usually is provided as a control valve in the EGR passage. Deposits are formed by the passage of the exhaust gas, and thus formed deposits cause the recirculating exhaust gas to change its flow characteristic. Particularly, the deposit around the throttling portion of the EGR valve exerts a large influence on the flow characteristic and thus hinders correct EGR control.

SUMMARY OF THE INVENTION

The object of this invention is to provide a control valve for EGR apparatus which prevents changes in the flow characteristic due to the formation of deposits.

In order to attain the above object, a control valve of EGR apparatus according to this invention has been provided which comprises a throttling member having a base located in the plane intersecting the stream of recirculating exhaust gas passing through a passage to lead the recirculating exhaust gas from the exhaust line to the suction line and a throttling portion extending a given length in the axial direction of said passage from the periphery of said base. A valve body connects to one end thereof to the diaphragm inside a chamber forming member and at the other end thereof, enters and leaves a hole provided in said base of said throttling member to close and open the passage of said throttling member, the inside diameter of the hole of said base of said throttling member being smaller than that of the hole of said throttling portion. The valve body is provided with an end portion having an outside diameter a little smaller than the inside diameter of the hole of said base, and a large diameter portion following said end portion and having a diameter larger than the inside diameter of the hole of said base, whereby the length of said end portion in the axial direction is selected so that at least the end of said end portion passes said base when said large diameter portion of said valve body is in contact with said base.

Further, in this invention, the thickness of the base of said throttling member in the axial direction is sufficiently smaller than the inside diameter of the hole of said base.

DETAILED DESCRIPTION OF THE PREFERRED EMBODIMENT

Figure 1:
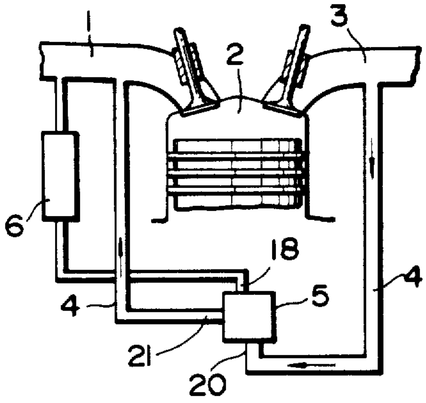
FIG. 1 is a schematic illustration of a known EGR apparatus.

FIG. 1 schematically illustrates the EGR apparatus. The gas mixture obtained in a carburetor enters a combustion chamber 2 through a suction passage 1. The exhaust gas after burning in the combustion chamber 2 is released to the open air through an exhaust passage 3. Part of the exhaust gas in the exhaust passage 3 is led to the suction passage 1 through an EGR passage 4. The EGR valve 5 opens and closes the EGR passage 4 on a negative pressure signal sent from the suction passage 1 through a negative pressure controller 6. The negative pressure controller 6 is of a known type, and controls the suction tube negative pressure in relation to the operating parameters of an engine, for example, the engine load, vehicle speed, acceleration, deceleration, engine temperature, etc., and sends thus controlled negative pressure to the EGR valve 5. In the case of a known negative pressure controller 6 of a very simple construction, when the engine load is lower than a prescribed value, a pressure, close to the atmospheric pressure, upstream of the carburetor throttling valve is fed to the EGR valve 5 from the negative pressure controller 6 to close the EGR passage 4. Thus, EGR is stopped, thereby preventing unstable operation of the engine. On the other hand, when the engine load is higher than the above prescribed value, the suction tube negative pressure downstream of the carburetor throttle valve is fed to the EGR valve 5 from the negative pressure controller 6 to open the EGR passage 4.

Thus, EGR is conducted, thereby controlling the formation of nitrogen oxides.

Figure 2:
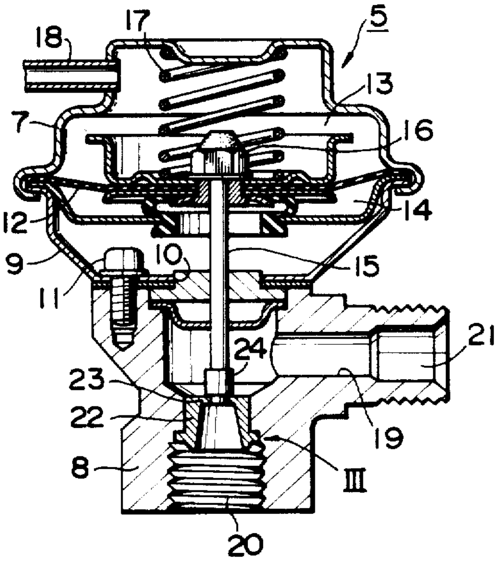
FIG. 2 is a view of an embodiment of this invention.

FIG. 2 illustrates the EGR valve 5 in detail. The valve 5 includes a chamber forming hollow member 7 and a housing 8. The and the member 7 includes a bracket 9 having a receiving hole 10. The housing 8 is socketed into the hole 10 and connected firmly by a bolt 11 with the bracket 9. The inside of the member 7 is divided by a diaphragm 12 into two control chambers 13 and 14. A shaft 15 extends from the diaphragm 12 through the chamber 14 and the bracket 9 into the housing 8. The shaft 15 is at one end thereof secured by a nut 16 to the center of the diaphragm 12. There is provided a coil spring 17 in the chamber 13, and the spring 17 abuts against the diaphragm 12 to push the diaphragm 12 toward the chamber 14. The control chamber 13 is connected to the negative pressure controller 6 through a connecting port 18, and the control chamber 14 communicates with the open air or a pressure source of substantially atmospheric pressure.

The housing 8 includes an elbow-shaped passage 19, one end thereof defined as a inlet port 20 of exhaust gas, and another end thereof defined as a outlet port 21 of exhaust gas. There is provided a substantially cylindrical member 22 in the passage 19, the axis of the member 22 being aligned with the axis of the passage 19. A seat portion 23 is defined at the downstream part of the member 22, and the end portion of the shaft 15 within the housing 8 is defined as a valve body 24 opposite to the seat portion 23.

The diaphragm 12 moves according to the pressure difference between the pressure of the chambers 13 and 14 and to the elastic force of the spring 17. The shaft 15 is driven by the diaphragm 12 toward the seat portion 23 or away from the seat portion 23.

Figure 3:
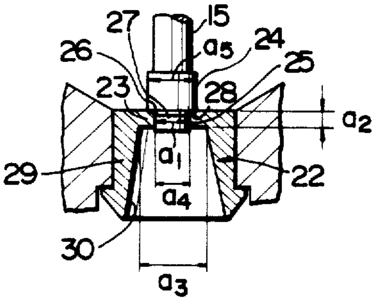
FIG. 3 is an enlarged view of the part III of FIG. 2.

FIG. 3 shows an enlarged view of the arrangement of the seat portion 23 and the valve body 24 closing the seat portion 23. The seat portion 23 has a through hole 25, the downstream end thereof being enlarged radially to define a tapered seat 26. The valve body 24 includes a rod portion 27 and a rod seat 28. The rod seat 28 abuts sealingly against the tapered seat 26 when the diaphragm pushes the shaft 15 toward the member 22 with a sufficient force. The rod portion 27 is column-shaped and extends beyond the upstream end of the through hole 25 when the valve body closes the seat portion 23. The valve body 24 further includes a throttling portion 29 having a frust-conical hole 30 tapering toward downstream for throttling the gas flow in front of the seat portion 23.

The through hole 25 has a diameter of $a_1$ and an axial length of $a_2$. The frusto-conical hole 30 has a minimum diameter of $a_3$ at the downstream end adjacent to the seat portion 23. The rod portion 27 has a diameter of $a_4$, and the maximum diameter of the valve body 24 is $a_5$.

The free end surface of the rod portion 27 at the upstream end is shaped into a flat plane with an acute peripheral edge perpendicular to the axis of the valve body 24 so that the rod portion 27 at its peripheral edge scrapes off the deposit formed on the inner surface of the hole 25 when the shaft moves upstream.

The length $a_2$ is sufficiently short, preferably not more than 2 [mm], in order to prevent the rod portion 27 from sticking due to the deposit on the inner surface of the hole 25. If the length $a_2$ were relatively long, the area of the inner surface of the hole 25 frictionally contacting with the rod portion 27 would be large, and the friction would increase to cause the rod 27 to stick.

Diameter $a_1$ is sufficiently larger than the length $a_2$. Therefore, the surface friction at the inner surface of the hole 25 is sufficiently small relative to the momentum of the gas flow. Accordingly the formation of deposit on the inner surface of the hole 25, namely the substantial diminishment of the diameter of the hole 25, does not disadvantageously affect the flow characteristic of the recirculating exhaust gas.

Figure 6:
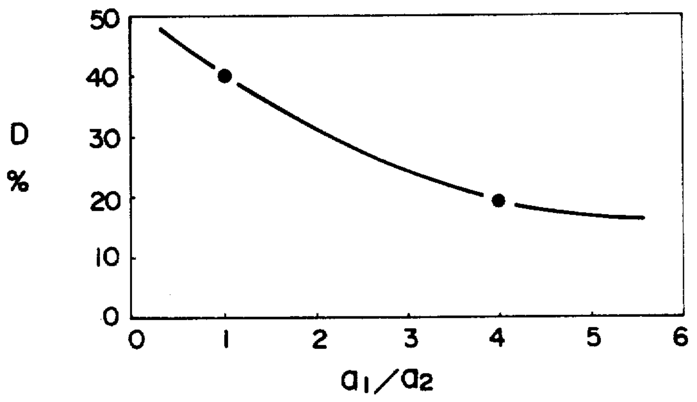
FIG. 6 is a diagram showing the relationship between the decreasing rate of the EGR rate and the ratio of $a_1/a_2$.

It is experimentally confirmed that $a_1$ is preferably selected to be not less than 4 $a_2$. As shown in FIG. 6 the decreasing rate D of the EGR rate becomes lower as the ratio of $a_1/a_2$ becomes greater. While when $a_1/a_2 \geqq 4$ the decreasing rate D of the EGR rate is substantially constant.

The EGR rate and the decreasing rate D are defined as follows.

$$EGR\ \text{rate} = \frac{Ge}{Ga + Ge} \cdot 100$$

Ga: flow rate of suction air [g/sec]

Ge: recirculation flow rate of exhaust gas [g/sec]

D={(maximum rate of the EGR rate)−(actual rate of the EGR rate)}/(maximum rate of the EGR rate)

Figure 7:
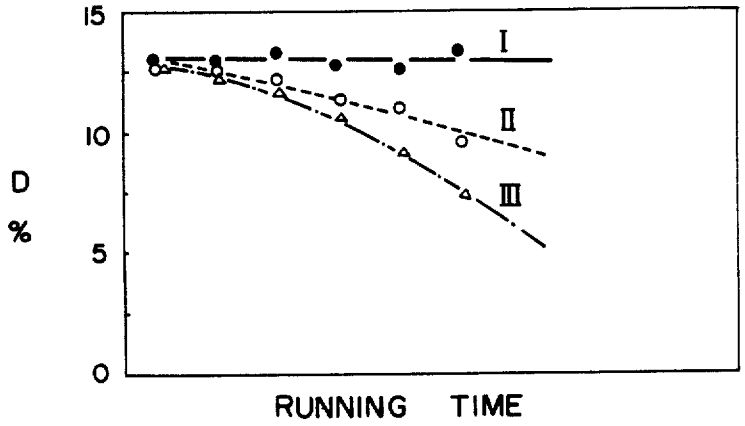
FIG. 7 is a diagram showing the relationship between the EGR rate and the running time.

In FIG. 7 curve I shows the change of D% when $a_1/a_2=4$ and the deposit on the inner surface of the through hole 25 is scraped off by the rod portion 27, curve II shows the change of D% when $a_1/a_2=4$ and the deposit is not scraped, and curve III shows the change of D% when $a_1/a_2=1$ and the deposit is not scraped. The curves are experimentally given under the following condition.

| | |
|---|---|
| Rotational speed of engine | 3000 rpm |
| Load | none |
| Reciprocating cycle of EGR valve | 60 sec |
| Opening period of EGR valve per one cycle | 59 sec |

The diameter $a_3$ is sufficiently greater than the diameter $a_1$ so that at the juncture of the through hole 25 and the hole 30 a large amount of deposit is formable.

Figure 4:
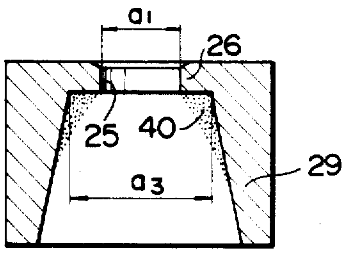
FIG. 4 shows the deposit formed on the stepped portion.
Figure 5:
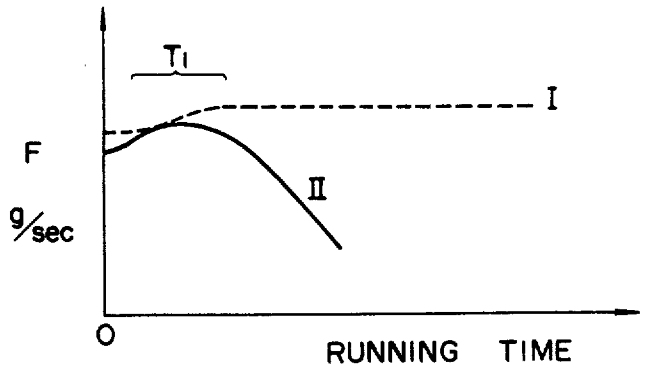
FIG. 5 is a diagram showing the change of the flow rate through the control valve according to the running time.

As shown in FIG. 4 the deposit 40 at the juncture builds up a passage, the cross-sectional area of which decreases gradually toward downstream without an abrupt change. Therefore the exhaust gas flows through the juncture with minimized pressure loss. As shown in FIG. 5 the flow rate of exhaust gas F g/sec through the control valve becomes higher due to the formation of the deposit 40 at the juncture (curve I), thereafter the flow rate is kept high by the scraping of the deposit on the inner surface of the through hole 25. As shown by curve II in FIG. 5, without scraping of the deposit on the inner surface of the through hole 25 the flow rate F becomes lower after the formation of the deposit 40 at the juncture.

When the pressure in the control chamber 13 is nearly equal to the atmospheric pressure, the diaphragm 12 deflects toward the control chamber 14 by the force of the spring 17, bringing the seat 28 of the valve body 24 into contact with the valve seat 26. During such a movement of the valve body 24 the free end of the rod portion 27 scrapes the deposit on the inner surface of the hole 25. As described above the length of the rod portion 27 is longer than the length $a_2$ so that the rod portion thoroughly scrapes the inner surface of the hole 25.

On the other hand, when the control chamber 13 is under a negative pressure higher than a prescribed value, the diaphragm 12, overcoming the force of the spring 17, deflects toward the control chamber 13 to separate the seat 28 from the seat 26 until the rod portion 27 is removed thoroughly from the hole 25 so that the rod portion 27 allows the sufficient flow of the exhaust gas. The inner surface of the EGR passage 4, the inner surfaces of the ports 22 and 23, the inner surface of the passage 19 in the housing 8, and further the tapered surface of the throttling portion 29 of the member 22 are finished smooth by machining or chemical surface treatment such as Teflon coating.

With the passage of the recirculating exhaust gas, deposits are formed on the inner surfaces of the ports 20 and 21, holes 25 and 30, and passage 19 of the EGR valve 5. However, since the inner surfaces of the EGR passage 4, ports 20 and 21, the holes 25 and 30, and the passage 19 are smooth, the formation of deposits on these surfaces is minimized to a considerably low degree. The deposit formed on the surface of hole 25 is scraped off with the passage of the rod portion 27 following the opening and closing movement of the valve body 24. Therefore the minimized deposit may be scraped off.

In order to insure that the rod portion 27 scrapes the deposit and the rod portion does not stick due to the deposit, the clearance $(a_1-a_4)/2$ between the rod portion 27 and the hole 25 should be selected to be 0.1 ~ 0.4 mm.

Figure 8:
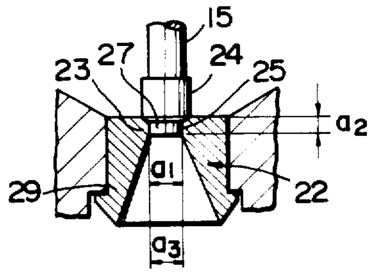
FIG. 8 is an enlarged view of the part III of FIG. 2 showing another embodiment of this invention.

FIG. 8 shows another embodiment of this invention. In this embodiment, the smallest inside diameter $a_3$ of the hole 30 at its juncture with the seat portion 23, is substantially equal with the inside diameter $a_1$ of the hole 25, so that there is provided no stepped portion at the juncture between the throttling portion 29 and the seat portion 23.

In this embodiment the seat portion 23 is reinforced by the throttling portion 29 against the force due to the rod portion when the seat 28 abuts against the seat 26.

What is claimed is:

1. A control valve for an exhaust gas recirculation apparatus disposed in a passage leading recirculating exhaust gas from an exhaust line to a suction line and designed to change the flow area of said passage in relation to air pressure acting on a diaphragm, said control valve comprising:

a seat portion provided in said passage and including a through hole coaxial with the exhaust line and having an upstream end and downstream end, the downstream end of said through hole defined as a tapered seat, said through hole having an axial length and a diameter at least four times the axial length of said through hole;

a valve body having an axis and comprising a seat sealingly abutting against said tapered seat and a rod portion extending from said seat towards said upstream end of said through hole, said rod portion having a diameter slightly smaller than the diameter of said through hole, said rod portion having an axial length longer than the axial length of said through hole and a free end so that when said seat abuts against said tapered seat the free end of said rod portion protrudes from the upstream end of said through hole, the free end surface of said rod portion at the upstream end being shaped into a flat plane with an acute peripheral edge perpendicular to the axis of the valve body, and said valve body being driven by the diaphragm; and a throttling portion having a hole with an upstream end and downstream end and coaxial with said through hole and communicated with the upstream end of said through hole;

said rod portion and said through hole cooperating such that the acute edge of said rod portion scrapes off any deposit formed on the inner surface of said through hole when said rod portion moves toward said upstream end of said through hole and the diminishment of the diameter of said through hole by such deposits, which would disadvantageously affect the flow characteristics of the recirculating exhaust gas, does not take place because of the sufficiently large diameter of said through hole in proportion to the axial length of said through hole.

2. A control valve as claimed in claim 1 wherein said through hole has an axial length not more than 2 mm in order to prevent said rod portion from sticking due to the deposit on the inner surface of said through hole.

3. A control valve as claimed in claim 1 wherein the clearance between said rod portion and said through hole is selected to be 0.1 ~ 0.4 mm so that said rod portion moves smoothly within said through hole and is available for scraping off the deposit on the inner surface of said through hole.

4. A control valve as claimed in claim 1 wherein the juncture of said through hole of said seat portion and said hole of said throttling portion is defined to be a stepped portion, and the diameter of the downstream end of said hole of said throttling portion is sufficiently larger than the diameter of the upstream end of said through hole so that the deposit on said stepped portion builds up a passage, the cross-sectional area of which decreases gradually toward the downstream end of said throttling portion without abrupt change.

5. A control valve as claimed in claim 1 wherein the downstream end of said hole of said throttling portion has a diameter the same as the diameter of the upstream end of said through hole so that the seat portion has enough strength not to deform due to the pressure of said rod portion.

6. A control valve as claimed in claim 1 wherein said hole of said throttling portion is coated by fluorocarbon polymers.

7. A control valve as claimed in claim 1, 4 or 5 wherein said hole of said throttling portion is tapered in the downstream direction.

* * * * *